United States Patent
Lee et al.

(10) Patent No.: US 7,869,796 B2
(45) Date of Patent: Jan. 11, 2011

(54) METHOD AND APPARATUS FOR MANAGING MULTIMEDIA MESSAGES

(75) Inventors: Kyung-Tak Lee, Yongin-si (KR); Wuk Kim, Gwacheon-si (KR); Sang-Kyung Sung, Seoul (KR); Thirumalai Echampadi Seshadri, Bangalore (IN)

(73) Assignee: Samsung Electronics Co., Ltd. (KR)

( * ) Notice: Subject to any disclaimer, the term of this patent is extended or adjusted under 35 U.S.C. 154(b) by 745 days.

(21) Appl. No.: 11/794,441

(22) PCT Filed: Dec. 27, 2005

(86) PCT No.: PCT/KR2005/004580

§ 371 (c)(1),
(2), (4) Date: Jun. 28, 2007

(87) PCT Pub. No.: WO2006/071053

PCT Pub. Date: Jul. 6, 2006

(65) Prior Publication Data

US 2007/0298770 A1    Dec. 27, 2007

(30) Foreign Application Priority Data

Dec. 28, 2004  (IN) .................. 1442/CHE/2004

(51) Int. Cl.
*H04M 1/725* (2006.01)
(52) U.S. Cl. .................. 455/412.2; 455/412.1; 455/418
(58) Field of Classification Search ........................ None
See application file for complete search history.

(56) References Cited

U.S. PATENT DOCUMENTS

| | | | |
|---|---|---|---|
| 2003/0046421 A1* | 3/2003 | Horvitz et al. | 709/238 |
| 2005/0041793 A1* | 2/2005 | Fulton et al. | 379/211.01 |
| 2005/0075932 A1* | 4/2005 | Mankoff | 705/14 |
| 2005/0240655 A1* | 10/2005 | Lipton et al. | 709/207 |
| 2005/0260974 A1* | 11/2005 | Lee et al. | 455/412.2 |

FOREIGN PATENT DOCUMENTS

| | | |
|---|---|---|
| JP | 64-78550 | 3/1989 |
| JP | 2001-189749 | 7/2001 |
| JP | 2002-108791 | 4/2002 |
| JP | 2004-048804 | 2/2004 |
| JP | 2004-287598 | 10/2004 |
| KR | 1020020044306 | 6/2002 |
| KR | 1020040089156 | 10/2004 |
| KR | 1020040107328 | 12/2004 |
| WO | WO 2004/056067 | 7/2004 |

* cited by examiner

*Primary Examiner*—Erika A Gary
(74) *Attorney, Agent, or Firm*—The Farrell Law Firm, LLP

(57) ABSTRACT

Disclosed are a method and an apparatus for managing multimedia messages. If receiving a request to set a retrieval reminder for a specific multimedia message from an MS, an MMS relay/server sets a reminder time for the specific multimedia message to a reminder time included in the request to set the retrieval reminder. If a current time corresponds to the reminder time, the MMS relay/server notifies the MS of retrieving the specific multimedia message. If receiving a request to extend an expiry time of the specific multimedia message from the MS, the MMS relay/server sets the expiry time of the specific multimedia message to an expiry time included in the request to extend the expiry time.

22 Claims, 10 Drawing Sheets

METHOD AND APPARATUS FOR MANAGING MULTIMEDIA MESSAGES

BACKGROUND OF THE INVENTION

1. Field of the Invention

The present invention relates to a multimedia messaging service, and more particularly to a method and an apparatus for reminding a user about the reception of multimedia messages according to settings of the user and extending the storage time of the multimedia message.

2. Description of the Related Art

Messaging services in mobile communication systems of the day provide not only small capacity texts, but also multimedia messages including much richer contents such as mass capacity text, audio, images, videos and so forth. An example of the messaging services for providing messages including such contents is a Multimedia Messaging Service (hereinafter referred to as "MMS"), which is being evolving into a service capable of improving users' conveniences and satisfactions.

A multimedia messaging system generally includes a plurality of mobile stations (hereinafter referred to as "MS"), and at least one MMS relay/server and a plurality of Multimedia Message Boxes (hereinafter referred to as "MM box") connected to the respective MMS relay/servers. A transaction process for transmitting/receiving common multimedia messages in the multimedia messaging system is shown in FIG. 1. In particular, FIG. 1 illustrates message flows at transmission of a common multimedia message.

In step 201, a first MS 1 requests a first MMS relay/server 5 to transmit a specific multimedia message to a second MS 3 by including the specific multimedia message in an MM1_submit.REQ message and transmitting the MM1_submit.REQ message to the first MMS relay/server 5. In step 203, the first relay/server 5 notifies the first MS 1 of accepting to transmit the multimedia message by sending back an MM1_submit.RES message in response to the MM1_submit.REQ message, and proceeds to step 205. In step 205, the first MMS relay/server 5 forwards an MM4_forward.REQ message including the specific multimedia message to a second MMS relay/server 7, to which the second MS 3 is connected, to request the second MMS relay/server 7 to transmit the multimedia message to the second MS 3. In response to this, in step 207, the second MMS relay/server 7 sends back a response, that is, an MM4_forward.RES message to the first MMS relay/server 5. In step 209, the second MMS relay/server 7 notifies the second MS 3 through an MM1_notification.REQ message that a message to be received by the second MS 3 has arrived. Here, a time, during which the corresponding multimedia message is stored in the second MMS relay/server 7, is provided in the MM1_notification.REQ message. This storage time may be set by the first MS 1 or a service provider. In step 211, the second MS 3 sends back a response, that is, an MM1_notification.RES message to the second MMS relay/server 7 to confirm the reception of the notification. In step 213, the second MS 3 asks the second MMS relay/server 7 to retrieve the corresponding multimedia message by transmitting an MM1_retlieve.REQ message. In step 215, the second MMS relay/server 7 transmits the multimedia message required through the MM1_retrieve.RES message. In step 217, the second MS 3 having received the multimedia message sends an acknowledgement, that is, an MM1_acknowledgement.REQ message, to the second MMS relay/server 7.

Also, it is possible for a user of the second MS 3 to store multimedia messages in an MM box. That is, following step 211 in FIG. 1, the second MS 3 asks the second MMS relay/server 7 to store any multimedia message, currently, stored in a temporary storage location of the second MMS relay/server 7 or to be received, in the MM box through an MM1_mmbox_store.REQ message. The second MMS relay/server 7 stores the corresponding multimedia message in the MM box and responds back an MM1_mmbox_store.RES message with a reference to the stored multimedia message to the second MS 3. When this function is invoked for a multimedia message already stored in the MM box, it is used to update some parameters of the multimedia message.

Any multimedia message can be uploaded and stored in the MM box through an MM1_mmbox_upload.REQ message. For example, the first MS 1 asks the first MMS relay/server 5 to store a multimedia message to be uploaded in the MM box by transmitting the MM1_mmbox_upload.REQ message including the multimedia message. The first MMS relay/server 5 stores the multimedia message in the MM box and responds back an MM1_mmbox_upload.RES message with a reference to the stored message to the first MS 1.

Also, a user of an MS can view multimedia messages stored in an MM box through an MM1_mmbox_view.REQ message. For example, the first MS 1 asks the first MMS relay/server 5 a listing of all or part of multimedia messages currently stored in an MM box, as well as information about the Multimedia messages themselves through the MM1_mmbox_view.REQ message. The first MMS relay/server 5 transmits an MM1_mmbox_view.RES message with a listing of the multimedia messages and their associated features to the first MS 1.

The multimedia messages stored in the MM box in a manner as stated above can be deleted through an MM1_mmbox_delete.REQ message. The first MS 1 asks the first MMS relay/server 5 to delete one or more multimedia messages currently stored in the MM box through the MM1_mmbox_delete.REQ message. The first relay/server 5 deletes the corresponding multimedia messages and transmits an MM1_mmbox_delete.RES to the first MS 1.

Multimedia messages managed as in this way are stored in a temporary storage location or an MM box only for a specific time period. That is, multimedia messages are deleted once expiry times set for the respective multimedia message are reached, regardless of whether the messages have been received by a recipient user. Therefore, multimedia messages can be deleted by an MMS relay/server without the recipient user being aware of the corresponding multimedia messages, e.g. in the case where he forgot about the existence of the messages in the MMS relay/server. On this account, there is an inconvenience in that the recipient user is forced to remember about every messages stored in the MMS relay/serve or in the MM box. However, the recipient user cannot remember all of the multimedia messages when the number of the messages is very large. Also, even if the user is aware that the message is going to be deleted, he/she may not be able to retrieve it before the expiry time because a sufficient disk space is not available in his/her MS, or he/she is located in a non-coverage area. In addition, he/she may hesitate the retrieval of the multimedia message because an expensive charge is paid for the retrieval when he/she is located in a roaming area. Especially if the multimedia message was stored in the MM box, the user may want to keep it longer there because he finds the content important.

For an MMS service provider, if retrievals of multimedia messages are financially charged, the fact that a user is unable to retrieve a multimedia message because the multimedia message was deleted due to its expiration represents a revenue loss. If the service provider provided a service in which the user can extend the expiry time associated with the multimedia message, this represents a source for increasing the revenue of service providers.

SUMMARY OF THE INVENTION

Accordingly, the present invention has been made to solve at least the above-mentioned problems occurring in the prior art, and an object of the present invention is to provide a multimedia message management method and a multimedia message management apparatus for reminding a recipient user about a multimedia message stored or waiting for retrieval at a time when the user wishes reminders.

A further object of the present invention is to provide a multimedia message management method and a multimedia message management apparatus for reminding a recipient user about a multimedia message stored or waiting for retrieval before its expiry time.

A further object of the present invention is to provide a multimedia message management method and a multimedia message management apparatus for enabling a recipient user to modify and cancel one or more reminder times as desired.

A further object of the present invention is to provide a multimedia message management method and a multimedia message management apparatus for enabling a recipient user to confirm a retrieval reminder time associated with any multimedia message.

A further object of the present invention is to provide a multimedia message management method and a multimedia message management apparatus for extending an expiry time associated with any multimedia message.

A further object of the present invention is to provide a multimedia message management method and a multimedia message management apparatus for enabling a recipient user to retrieve a multimedia message at a time when he/she wishes to do so.

A further object of the present invention is to provide a multimedia message management method and a multimedia message management apparatus capable of increasing the revenue of service providers.

In order to accomplish these objects, in accordance with one aspect of the present invention, there is provided a method for managing multimedia messages, the method comprising the steps of: receiving a notification from an MMS relay/server that a multimedia message has arrived and waits for retrieval; receiving a request to set a retrieval reminder for a specific multimedia message from an MS; setting a reminder time for the specific multimedia message to a reminder time included in the request for the retrieval reminder; and if a current time corresponds to the reminder time, notifying the MS of retrieving the specific multimedia message.

In accordance with another aspect of the present invention, the method for managing multimedia messages may further comprise the steps of: receiving a request to extend an expiry time of the specific multimedia message from the MS; and setting the expiry time of the specific multimedia message to an expiry time included in the request to extend the expiry time.

In accordance with another aspect of the present invention, there is provided an apparatus for managing multimedia messages, the apparatus comprising: an MS for requesting a retrieval reminder for a specific multimedia message; and an MMS relay/server for setting a reminder time for the specific multimedia message to a reminder time included in the request to set the retrieval reminder, and notifying the MS of retrieving the specific multimedia message if a current time corresponds to the reminder time.

In accordance with another aspect of the present invention, if receiving a request to extend an expiry time of the specific multimedia message from the MS, the MMS relay/server sets the expiry time of the specific multimedia message to an expiry time included in the request to extend the expiry time.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
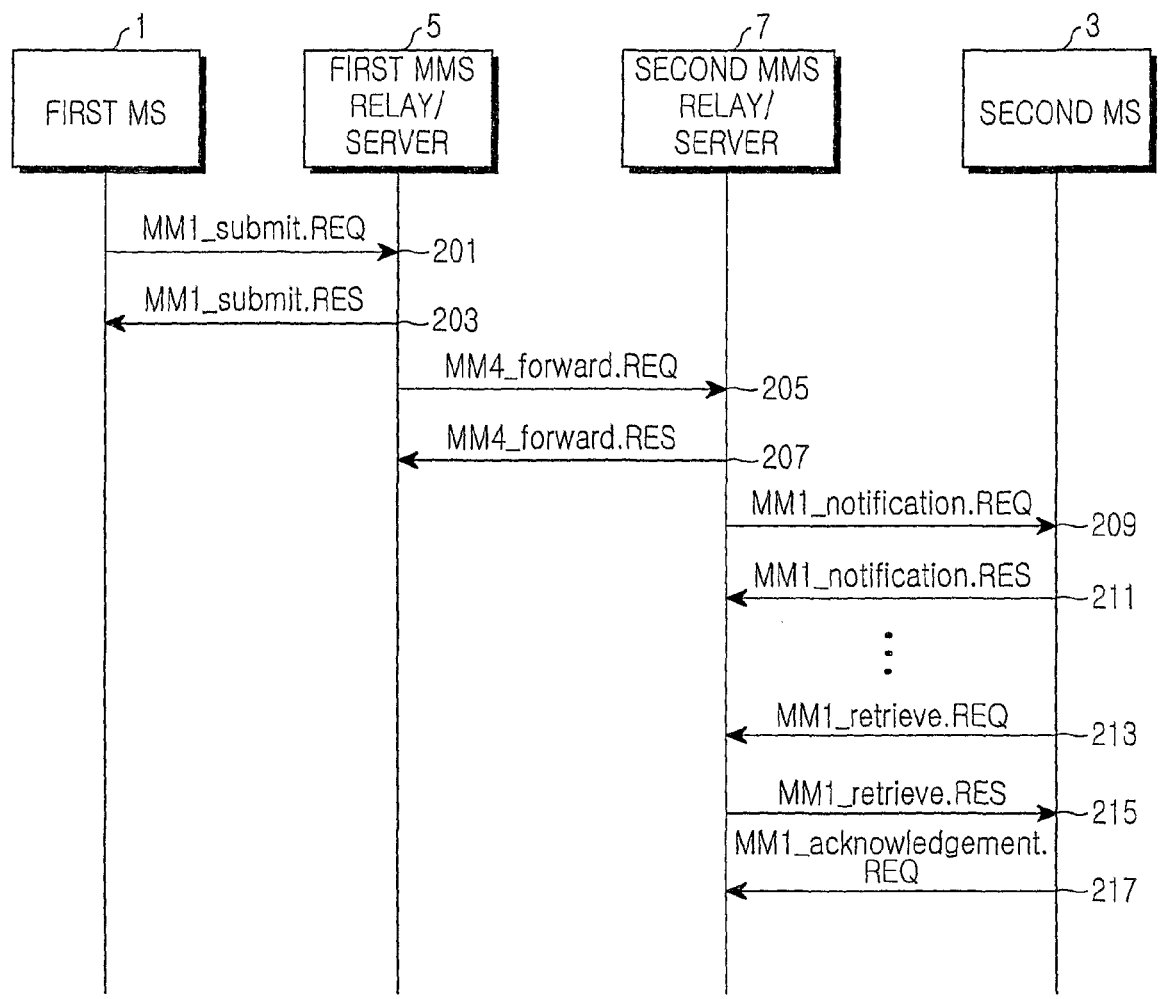
FIG. 1 is a flowchart illustrating message flows at transmission of a common multimedia message.

Hereinafter, preferred embodiments of the present invention will be described with reference to the accompanying drawings. It should be noted that the similar components are designated by similar reference numerals although they are illustrated in different drawings. Also, in the following description, a detailed description of known functions and configurations incorporated herein will be omitted when it may obscure the subject matter of the present invention.

Figure 2:
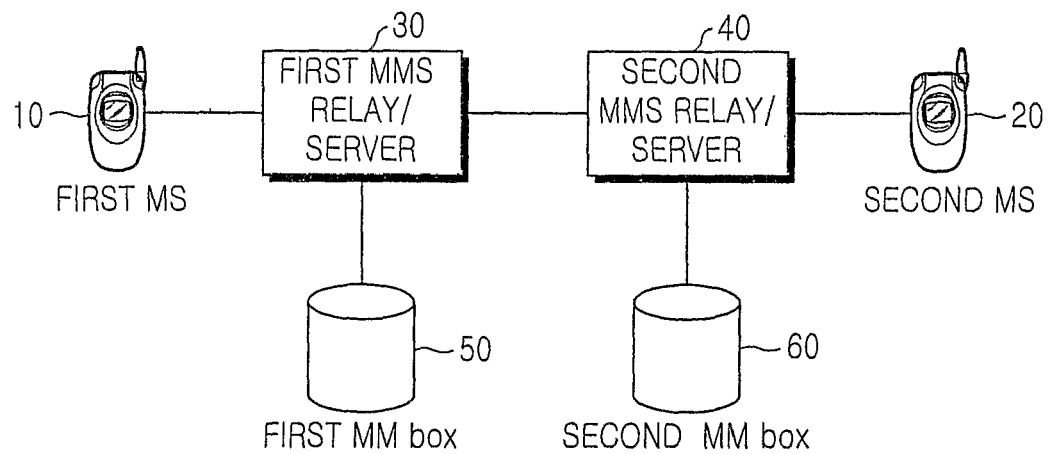
FIG. 2 is a view illustrating an architecture of a multimedia messaging system to which the present invention is applied.

First, an MMS system, to which the present invention is applied, will be described with reference to FIG. 2. FIG. 2 illustrates such an architecture of such an MMS system. Referring to FIG. 2, an MMS system includes a plurality of MSs 10, 20, at least one MMS relay/server 30, 40, and at least one MM box 50, 60.

Figure 3:
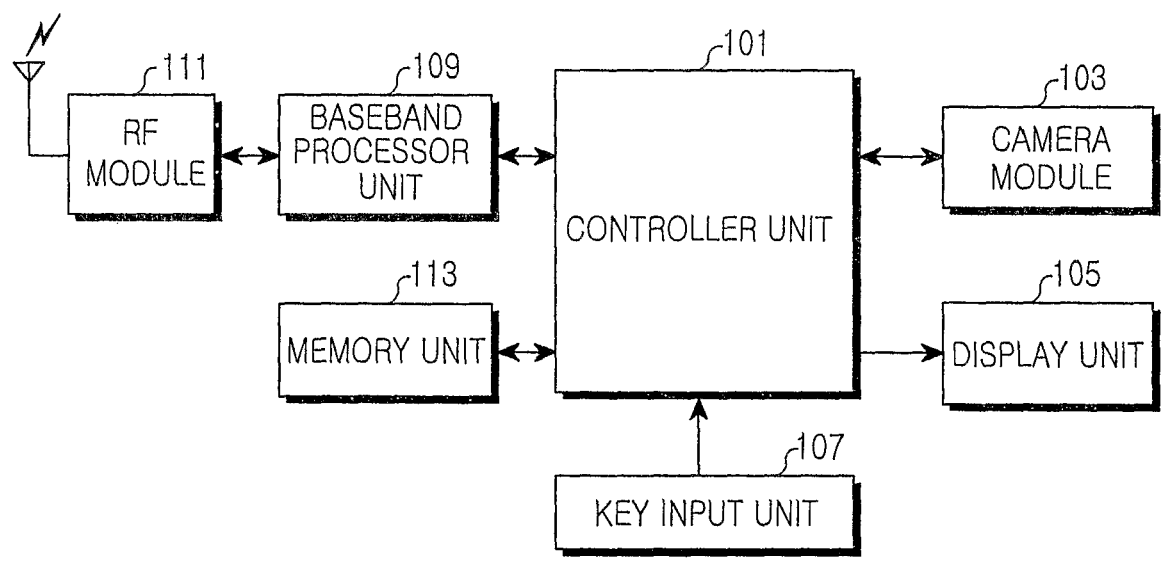
FIG. 3 is a view illustrating an architecture of an MS to which the present invention is applied.

The plurality of MSs 10, 20 wirelessly communicate with the MMS relay/server 30, 40 over a mobile communication network, and transmits multimedia messages at the request of a user or performs operations according to the user's requests related to the management of multimedia messages stored in the MM box 50, 60 in accordance with the present invention. In one example of the present invention, the plurality of MSs 10, 20 includes a first MS 10 and a second MS 20. The MSs 10, 20 draws a multimedia message according to the user's inputting, requests the MMS relay/server 30, 40 to transmit the drawn multimedia message to the other MS and to upload it into the MM box 50, 60. Also, the MSs 10, 20 request the MMS relay/server 30, 40 to view, download and delete a multimedia message stored in the MM box 50, 60. If any multimedia message to be retrieve is notified from the MMS relay/server 30, 40, the MS 10, 20 retrieves the multimedia message or requests the MMS relay/server 30, 40 to store it in the MM box 50, 60. According to a first preferred embodiment of the present invention, the MSs 10, 20 sets a retrieval reminder for the multimedia message at the request of the user. The retrieval reminder refers to a function in which the MSs 10, 20 notify the user of retrieving the multimedia message at a time set by the user or at a predetermined default time. An architecture of the MSs 10, 20 is illustrated in FIG. 3. That is, FIG. 3 illustrates an architecture of an MS to which the present invention is applied.

Referring to FIG. 3, each of the MSs 10, 20 includes a controller unit 101, a camera module 103, a display unit 105, a key input unit 107, a baseband processor unit 109, an RF module 111, and a memory unit 113.

The camera module 103 outputs image frames obtained by an image sensor under the control of the controller unit 101.

The display unit 105 displays various image information or data information received from a base station or stored in the memory unit 113 on a display screen under the control of the controller unit 101.

The key input unit 107 is provided with numeric keys from 0 to 9, a asterisk key, a sharp key, and a plurality of function keys corresponding to various functions of the MS, such as a menu key, a selection key, a call key, a deletion key, a power/end key and a volume key, and provided input data corresponding to keys pressed by the user to the controller unit 101.

The RF module 111 transmits/receives radio signals to/from a mobile communication base station through an antenna. The RF module 111 modulates a signal to be transmitted, which is inputted to the controller unit 11 through the baseband processor unit 109, and transmits the modulated RF signal through the antenna. Also, the RF module 111 demodulates an RF signal received through the antenna to provide the demodulated signal to the controller unit 101 through the baseband processor unit 109. The baseband processor unit 109 processes baseband signals transmitted/received between the RF module 111 and the controller unit 101.

The memory unit 113 stores programs for processing and control of the controller unit 101, reference data, various updatable archive data, received multimedia messages, multimedia messages drawn according to the user's inputting, etc., and is provided as a worldling memory of the controller unit 101. Also, the memory unit 113 stores program data related to retrieval reminder settings according to the present invention.

Figure 4:
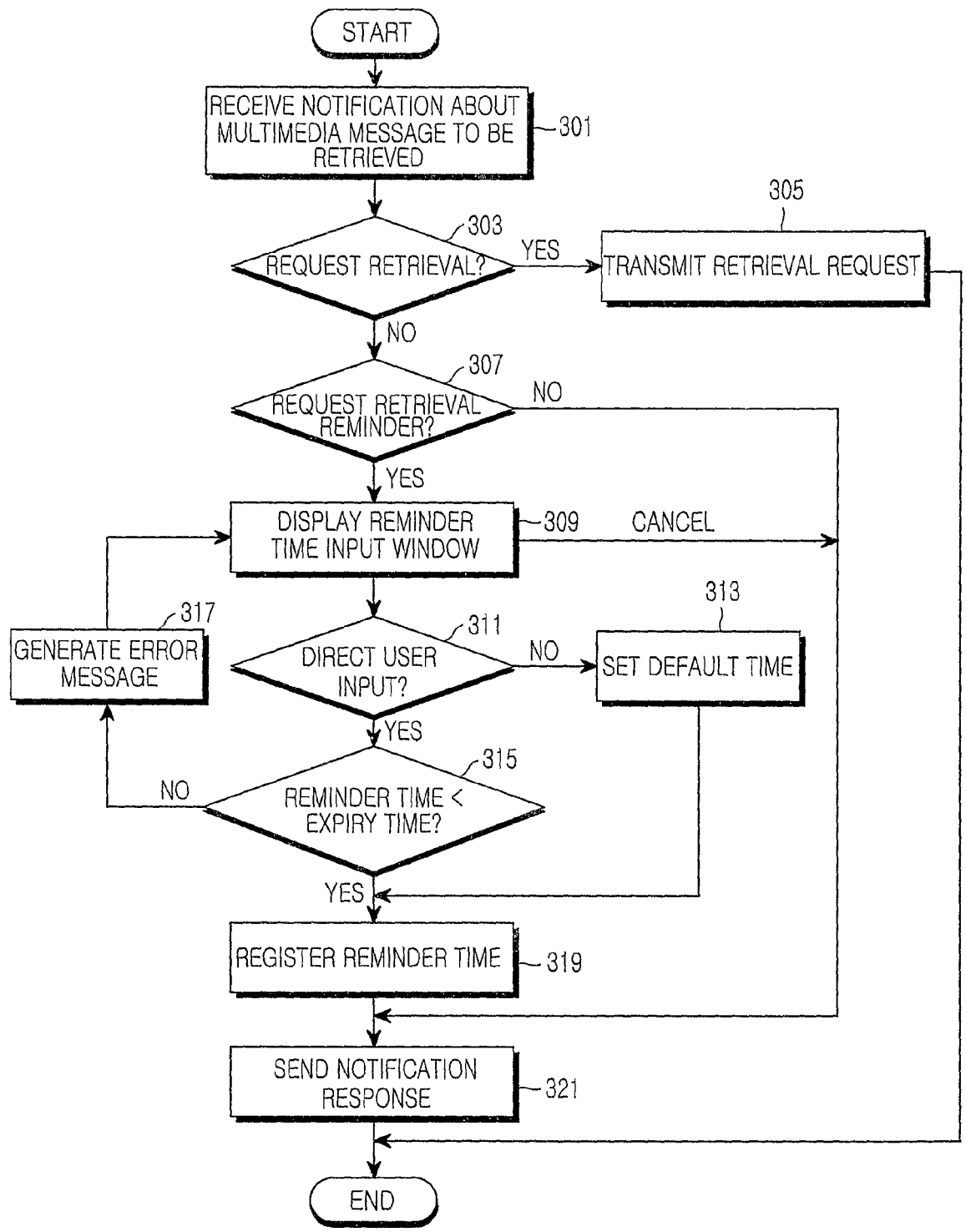
FIG. 4 is an operational flowchart of an MS when a reminder time is set in accordance with a first preferred embodiment of the present invention.

If a retrieval reminder is asked at the request of the user when there is received a notification from the MMS relay/server 30, 40 that any multimedia message to be retrieved, the MS 10, 20 having the above-mentioned architecture sets a retrieval reminder time to a specific time inputted by the user or a predetermined default time. Also, if a current time corresponds to the set retrieval reminder time, the MS 10, 20 notifies the user of retrieving the multimedia message. Such a retrieval reminder setting process is shown in FIG. 4. FIG. 4 illustrates an operational flowchart of an MS when a reminder time is set in accordance with a first preferred embodiment of the present invention.

Referring to FIG. 4, in step 301, if receiving a notification from an MMS relay/server, for example, the second MMS relay/server 40, that a message has arrived and is waiting for retrieval, the controller unit 101 of a MS, for example, the second MS 20, displays the notification contents and proceeds to step 303. The notification contents include a message checking whether the user wants to retrieve the multimedia message immediately.

In step 303, the controller unit 101 checks the answer from the user. If an immediate retrieval is requested, the controller unit 101 proceeds to step 305, otherwise it proceeds to step 307.

In step 305, since the immediate retrieval is requested, the controller unit 101 requests the second MMS relay/server 40 to immediately retrieve the multimedia message as usual, and terminates its operations.

In step 307, since the immediate retrieval is not requested in step 303, the controller unit 101 displays a message asking the user if he wants to be reminded about the multimedia message at a later time. If the answer is yes, the controller unit 101 proceeds to step 309. If the answer is no, the controller unit 101 proceeds to step 321 to transmit a notification response and terminate its operations. In step 309, the controller unit 101 displays a reminder time input window and proceeds to step 311. In step 311, the controller unit 101 checks if an input given directly by the user exists. If so, the controller unit 101 proceeds to step 315. If not, it proceeds to step 313 to set the reminder time to a predetermined default time and proceed to step 319. The predetermined default time may be 24 hours before an expiry time of a multimedia message, 24 hours later from a current time, and the like. The time entered directly by the user may be specified in an absolute time, e.g. Sun, 6 Nov. 1994 08:49:37 GMT, or a relative time, e.g. 3600 seconds later. In addition, in a state where the reminder time input window is displayed in step 309, the setting of the retrieval reminder may be canceled. In step 315, the controller unit 101 checks whether the reminder time entered by the user occurs before the time of expiry of the multimedia message. If it occurs after the expiry time, the user input is not valid and the controller unit 101 proceeds to step 317. Otherwise, the user input is valid and it proceeds to step 319. In 317, the controller unit 101 generates an error message to notify the user, and proceeds to step 309 to display the reminder time input window again. The expiry time of the multimedia message is transmitted while included in the notification message from the first MMS relay/server 30 in step 301.

In step 319, since the reminder time entered by the user has been checked as occurring before the expiry time of the multimedia message in the first MMS relay/server 30 in step 315, the controller unit 101 registers the reminder time and then proceeds to step 321. In 321, the controller unit 101 sends a response to the notification received in step 301, and terminates its operations.

Once the retrieval reminder has been set by registering the reminder time through the above-mentioned procedures, the controller unit 101 determines if a current time corresponds to the reminder time, and provides a message leading the user to retrieve the corresponding multimedia message. If the second MS 20 retrieves the multimedia message before any reminder time, the reminder setting related to the reminder time may be automatically canceled or canceled according to the user's choice.

In the first embodiment of the present invention, the MS 10, 20 sets the retrieval reminder and notifies the user of retrieving the multimedia message at a specific reminder time. However, in another embodiment of the present invention, the MMS relay/server 30, 40 may provide a reminder service in which the MMS relay/server 30, 40 sets the reminder time at the request of the MS 10, 20, and notifies the MS 10, 20 of the existence of the multimedia message at the corresponding reminder time. Hereinafter, an MMS system according to such another embodiment of the present invention will be described with reference to FIG. 2.

The plurality of MSs 10, 20 are similar to those in the first embodiment in view of their architectures and operations. However, if a reminder time for any multimedia message is set according to the process shown in FIG. 4, a retrieval reminder setting request including the set reminder time and the corresponding multimedia message is transmitted to the MMS relay/server 30, 40. Also, according to the second embodiment of the present invention, the MS 10, 20 can request to modify and cancel a preset reminder time and can also request to view reminder currently set. This retrieval reminder setting request are effective to both of multimedia messages temporarily stored in the MMS relay/server 30, 40 and multimedia messages stored in the MM box 50, 60.

The plurality of MSS relays/servers 30, 40 are connected to the plurality of MSs 10, 20 over a mobile communication network, and the MSS relays/servers 30, 40 are also connected to each other over the mobile communication network. The MMS Relay/Server 30, 40 is a system element that executes the MMS related requests of the user, and simultaneously is a central element of an MMS network. That is, the MMS relay/server 30, 40 is responsible for messaging activities not only with other MMS relay/servers, but also with other messaging systems like email. It also provides message storage services. The MMS relay/server 30, 40 can be divided into two components, an MMS proxy-relay for the interaction with the MSS 10, 20 and other messaging systems, and an MMS server for the storage services. The plurality of MMS relays/servers 30, 40 includes a first MMS relay/server 30 and a second MMS relay/server 40. The first MMS relay/server is a relay/server connected to the first MS 10 over the mobile communication network, and the second MMS relay/server is a relay/server connected to the second MS 20 over the mobile communication network. In this specification, the connection of the MMS relay/server and any MS over the mobile communication network means that the MS is located in a service coverage area of the MSS server. In the second embodiment of the present invention, the MS relay/server 30, 40 sets a retrieval reminder for a corresponding multimedia message in response of a retrieval reminder setting request of the MS 10, 20, and notifies the MS 20 of retrieving the corresponding multimedia message at a specific time set at the retrieval reminder setting. In order to operate correspondingly, the MMS relay/server 30, 40 is provided with a timer event manager according to the second embodiment of the present invention. The timer event manager performs time checking for ant event requiring timer setting. The MMS relay/server 30, 40 registers a reminder time with the timer event manager according to the retrieval reminder setting request, and thus can perform the event such that a notification is transmitted to the MS when the set time is reached. Also, according to the second embodiment of the present invention, the MMS relay/server 30, 40 modify or cancels the reminder time of the set retrieval reminder at the request of the MS 10, 20, and transmits information on the set retrieval reminder to the MS 10, 20 in response to a reminder viewing request. The MMS relay/server 30, 40 also applies the above-mentioned retrieval reminder setting and operations associated therewith to multimedia messages stored in the MM box 50, 60.

The plurality of MM boxes 50, 60 represent a storage device associated with the MMS relays/servers 30, 40, and are used for persistent and network-based message storage. A user of the MS 10, 20 can interact with the MMS relay/server to manage multimedia messages stored in the MM box 50, 60. The plurality of MM boxes 50, 60 includes a first MM box 50 and a second MM box 60. The first MM box 50 is connected to the first MMS relay/server 30, and the second MM box 60 is connected to the second MMS relay/server 40.

Figure 5:
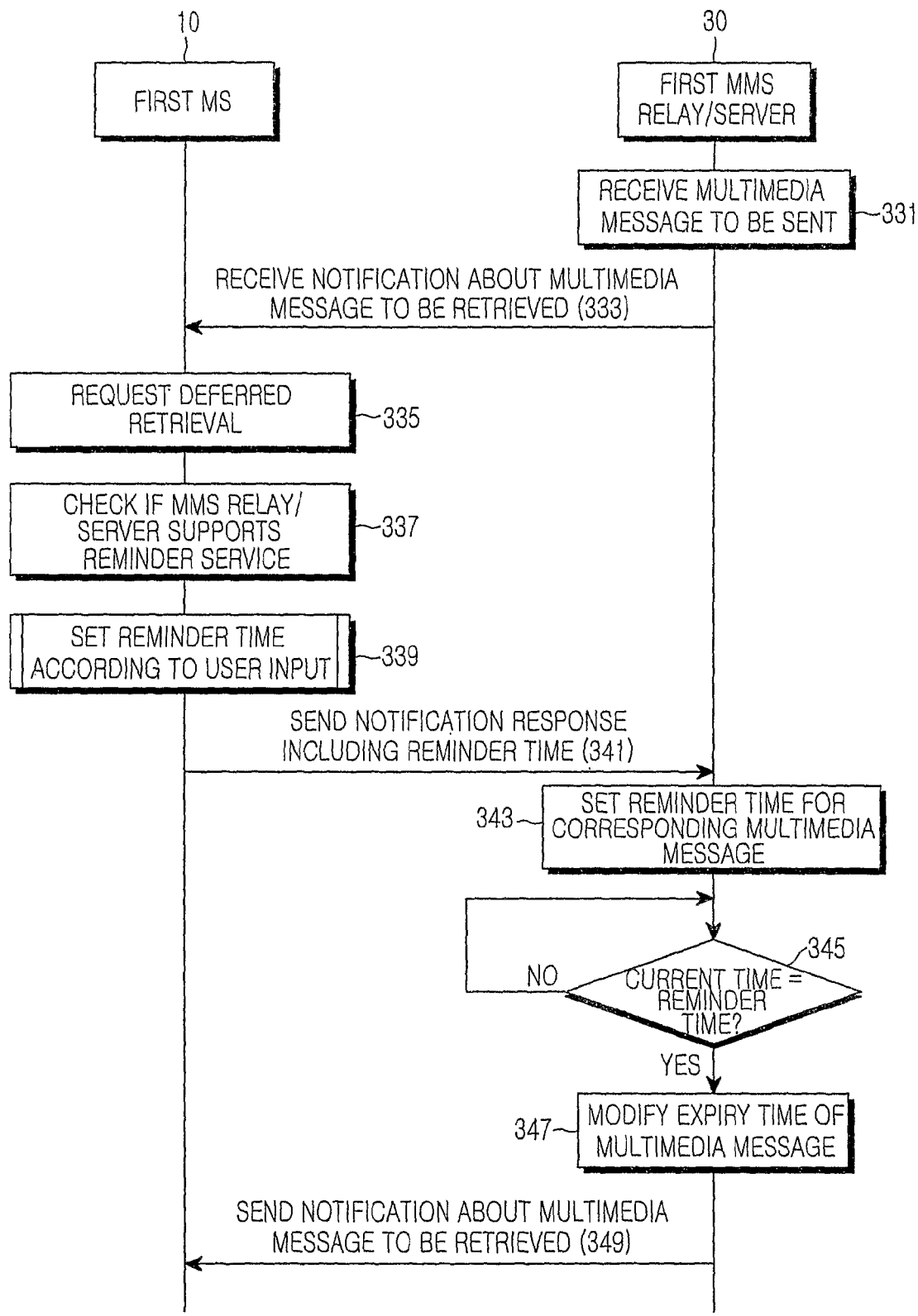
FIG. 5 is a flowchart illustrating a process of setting a reminder service when a multimedia message to be retrieve is notified in accordance with a second preferred embodiment of the present invention.
Figure 6:
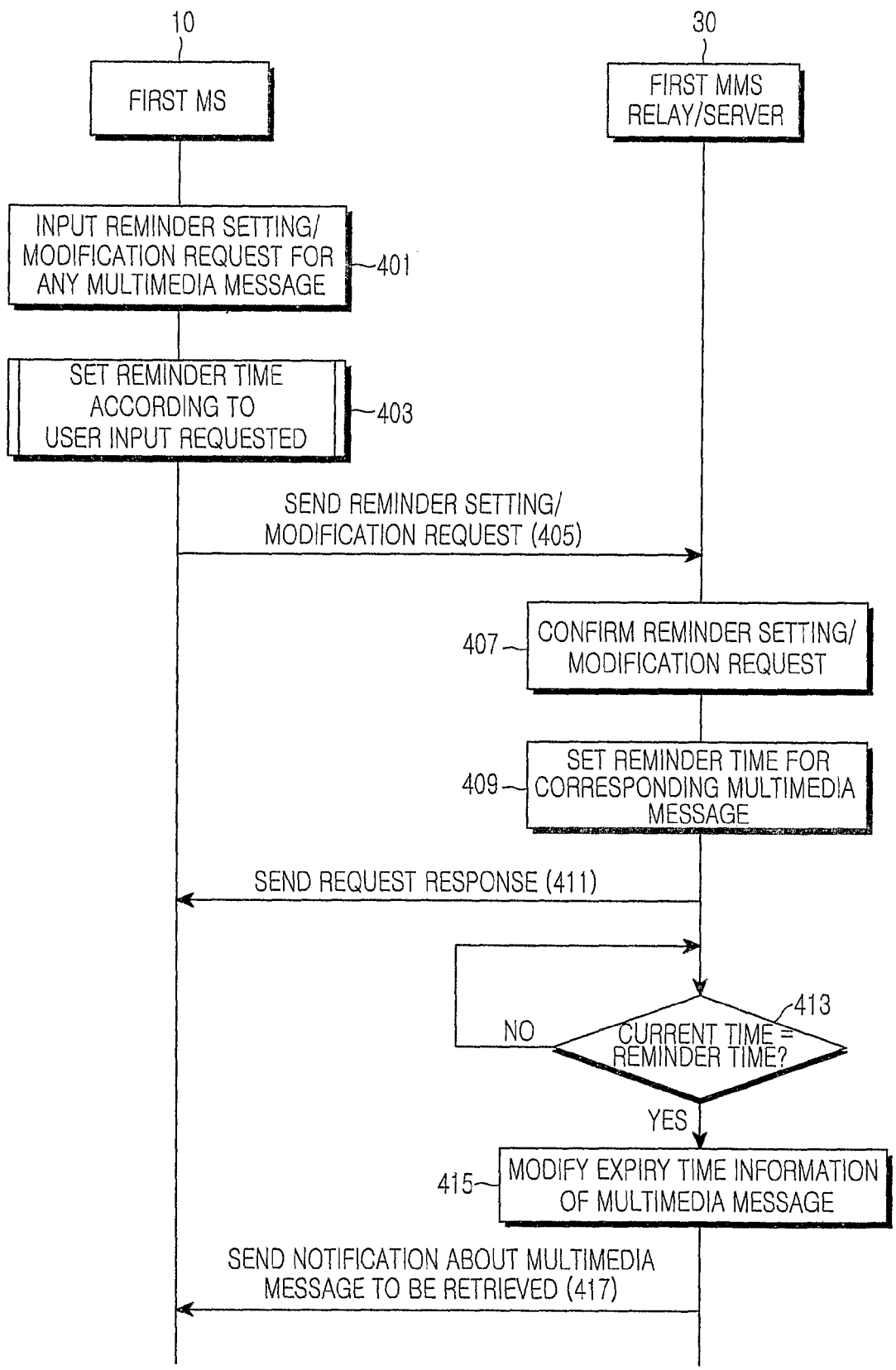
FIG. 6 is a flowchart illustrating a reminder service setting/modification process in accordance with the second embodiment of the present invention.

In the so-constructed MMS system, a retrieval reminder setting request from the MS 10, 20 can be made when it transmits a response to a notification from the MMS relay/server that there is a multimedia message to be retrieved, or can be made at the request of the user at any time. FIG. 5 illustrates a process of setting a reminder when a multimedia message to be retrieve is notified in accordance with the second preferred embodiment of the present invention, and FIG. 6 illustrates a reminder setting/modification process in accordance with the second embodiment of the present invention.

Referring first to FIG. 5, in step 331, if receiving a multimedia message to be transmitted to the first MS 10, the first MMS relay/server 30 proceeds to step 333. In step 333, the first MMS relay/server 30 send a notification about the multimedia message to be retrieved to the first MS 10. The first MS 10 having received the notification proceeds to step 337 if its user requests a deferred retrieval, that is, an immediate message retrieval is absent. In step 337, the first MS 10 checks if the first MMS relay/server 30 supports retrieval reminder setting, and then proceeds to step 339. Whether or not the first MMS relay/server 30 supports the retrieval reminder setting is included in the notification sent in step 333. In step 339, the first MS 10 sets a reminder time according to the user's inputting through steps 307 to 319 in FIG. 4, and proceeds to step 341. In step 341, the first MS 10 requests the retrieval reminder setting by sending a notification response including the reminder time to the first MMS relay/server 30. The first MMS relay/server 30 having received the notification response in step 341 sets the reminder time for the corresponding multimedia message in step 343. Thereafter, in step 345, the first MMS relay/server 30 checks if a current time corresponds to the reminder time set in step 343, and proceeds to step 347 if the current time corresponds to the reminder time. In step 347, the first MMS relay/server 30 modifies an expiry time of the corresponding multimedia message, and proceeds to step 349. Since the modification of the expiry time of the corresponding multimedia message is intended to resend a notification after a defined time elapses from the initial notification, it is preferred that the expiry time is modified in consideration of the defined time. For example, if an expiry time of 48 hours remains in the previous notification and a notifications is resent 24 hours after the previous notification according to the retrieval reminder setting, the expiry time of the corresponding multimedia message must be modified such that a expiry time of 24 hours remains. In step 349, the first MMS relay/server 30 provided the retrieve reminder to the first MS 10 by notifying it of the multimedia message to be retrieved.

The retrieval reminder setting request as stated above can be configured such that it is performed through an MM1_notification transaction according to a preferred embodiment of the present invention. The MM1_notification transaction is a transaction that is generally used when an MMS relay/server sends a notification about a multimedia message to be retrieved to an MS. In the preferred embodiment of the present invention, by including new information elements in MM1_notification.REQ and MM1_notification.RES messages included in the MM1_notification transaction, the MM1_notification transaction can be configured such that the retrieval reminder service is requested through the MM1_notification transaction.

The new information element added to the MM1_notification.REQ according to the present invention is shown in Table 1.

TABLE 1

| Information Element | Description |
| --- | --- |
| Allow Reminder | Default = No.<br>Indicates whether the MMS Relay/Server supports reminders for this multimedia message. |

Two values are possible for this "Allow Reminder" information element, either "Yes" or "No". If not specified, the default value should be "No", meaning that the relay/server does not support the retrieval reminder service. The first MS 10 receives the MM1_notification.REQ message in step 333, and checks in step 337 what is the value of the "Allow Reminder" information element included in the MM1_notification.REQ message. If it is included and its value is "Yes", the first MS 10 proceeds to step 339. Otherwise, the first MS 10 simply sends a standard notification response to the MMS relay/server.

Thereafter, the first MS 10 includes a reminder time inputted from the user or set as a default in the MM1_notification.RES message. Thus, the MM1_notification.RES message is configured such that it includes an information element as shown in Table 2.

TABLE 2

| Information Element | Description |
| --- | --- |
| Reminder Time | Default value = 0.<br>Indicates when to remind about the message associated with this notification response. |

The first MMS relay/server 30 receives the MM1_notification.RES message and registers the time contained in the "Reminder Time" information element as a reminder time of the corresponding multimedia message. If the MMS relay/server supports the reminder service, but if the "Reminder Time" information element is absent, then the MMS relay/server sets a default value of "0", meaning that the user has requested no reminder.

The reminder time set as stated above can be also altered and canceled at the request of the user. The retrieval reminder setting can be requested at any time the user wishes, as well as when a notification about any multimedia message is received. Hereinafter, this process will be described with reference to FIG. 6.

As shown in FIG. 6, in step 401, if reminder setting or modification for any multimedia message is requested, the first MS 10 proceeds to step 403. In step 403, the first MS 10 provides the user with an interface by which the user can set a reminder time. The user inputs a desired reminder time, and the first MS 10 sets the reminder time according to the user's inputting and then proceeds to step 405. In step 405, the first MS 10 sends a retrieval reminder service request or a reminder modification request including the set reminder time and information on the multimedia message to the first MMS relay/server 30. In step 407, the first MMS relay/server 30 confirms that the received request is the retrieval reminder service request or the reminder modification request, and proceeds to step 409. In step 409, the first MMS relay/server 30 sets the reminder time of the corresponding multimedia message to a time included in the request. That is, the first MMS relay/server 30 sets the reminder time to the time included in the request if the reminder time is not set for the corresponding multimedia message, and alters the reminder time into the time included in the request if the reminder time is set for the corresponding multimedia message. Afterwards, in step 411, the first MMS relay/server 30 transmits a response including the result about the request received in step 405 to the first MS 10. Thereafter, in step 413, the first MMS relay/server 30 checks if a current time corresponds to the reminder time, and proceeds to step 415 if so. In step 415, the first MMS relay/server 30 modifies an expiry time of the corresponding multimedia message, and proceeds to step 417. In step 417, the first MMS relay/server 30 transmits a notification about the multimedia message to be retrieved, which includes the modified expiry time, to the first MS 10.

Figure 7:
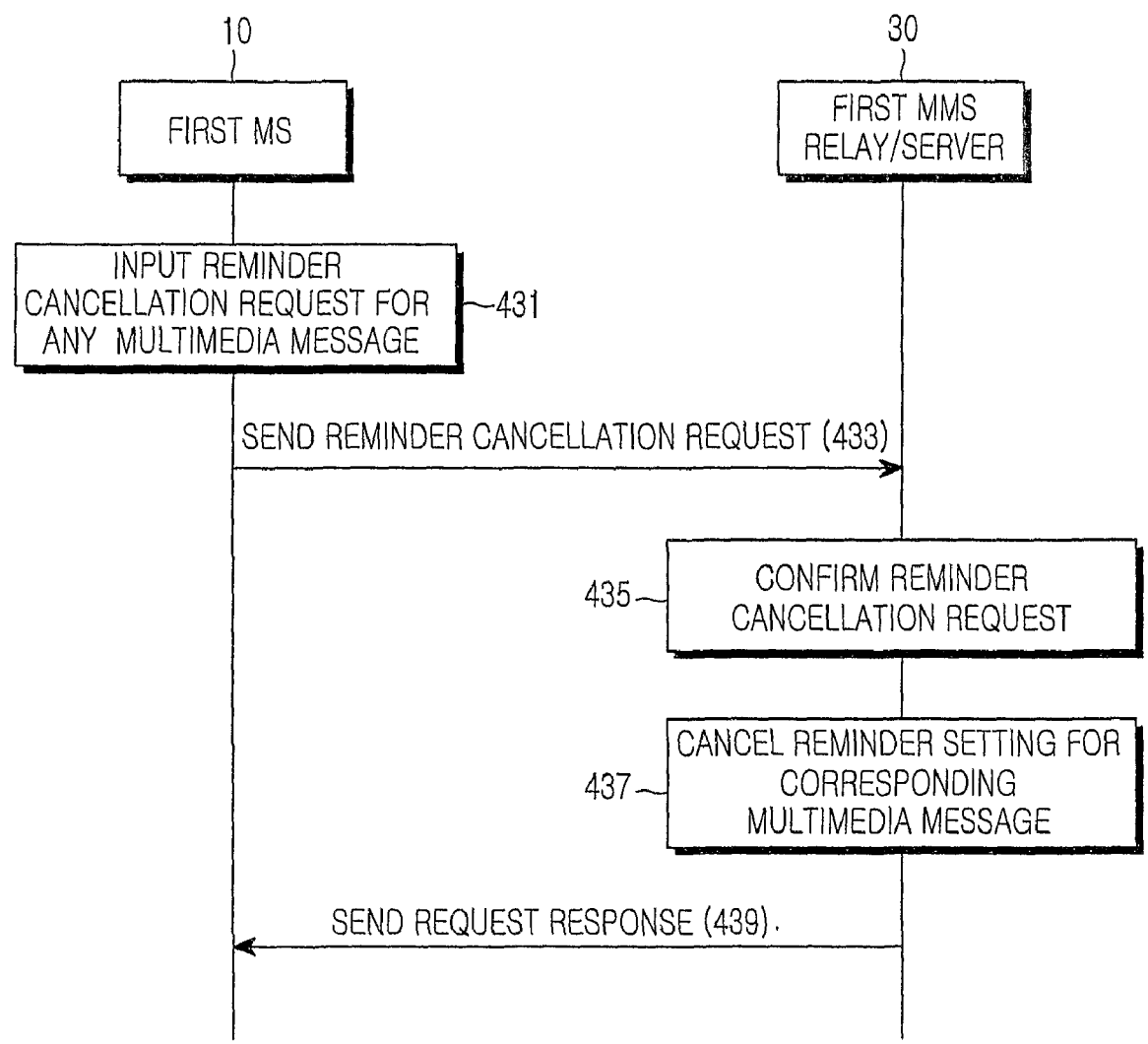
FIG. 7 is a flowchart illustrating a reminder cancellation process in accordance with the second embodiment of the present invention.

Hereinafter, a description will be given for a process of canceling a retrieval reminder service set for any multimedia message as stated above with reference to FIG. 7. FIG. 7 illustrates a reminder cancellation process in accordance with the second embodiment of the present invention. As shown in FIG. 7, in step 431, if the user inputs a reminder cancellation request for any multimedia message, the first MS 10 proceeds to step 433. In step 433, the first MS 10 send the reminder cancellation request including the multimedia message to the first MMS relay/server 30. The MMS relay/server 30 confirms that the received request is the reminder cancellation request, and proceeds to step 437. In step 437, the first MMS relay/server 30 cancels the reminder setting of the corresponding multimedia message, and proceeds to step 439. In step 439, the first MMS relay/server 30 transmits a response including the result about the received request to the first MS 10.

As stated above, the user may be able to request the retrieval reminder service at his pleasure without limitations on time or modify or cancel reminder times having been already set. This can be achieved through an MM1_reminder_alter transaction newly defined according to the second embodiment of the present invention. The MM1_reminder_alter transaction includes an MM1_reminder_alte.REQ message and the MM1_reminder_alter.RES message. The MM1_reminder_alter.REQ message is a message transmitted from an MS to an MMS relay/server at the retrieval reminder service request, the reminder time modification request and the reminder cancellation request, and an MM1_reminder_alter.RES message is a response message to the MM1_reminder_alter.REQ message.

Information elements included in the MM1_reminder_alter.REQ message is shown in Table 3.

TABLE 3

| Information Element | Description |
| --- | --- |
| Message Type | Identifies this message as MM1_reminder_alter.REQ |
| Transaction ID | The identification of the MM1_reminder_alter.REQ/MM1_reminder_alter.RES pair. |

TABLE 3-continued

| Information Element | Description |
| --- | --- |
| MMS Version | Identifies the version of the interface supported by the MS. |
| Message Reference | A reference that locates the message in the MMS Relay/Server. |
| Reminder Time | If present, then the request shall be considered as a new or modification request. If not present, then the request shall be considered as the cancellation request for the reminder. |

Information elements included in the MM1_reminder_alter.RES message is shown in Table 4.

TABLE 4

| Information Element | Description |
| --- | --- |
| Message Type | Identifies this message as MM1_reminder_alter.RES |
| Transaction ID | The identification of the MM1_reminder_alter.REQ/ MM1_reminder_alter.RES pair. |
| MMS Version | Identifies the version of the interface supported by the MMS Relay/Server. |
| Request Status | The status of the reminder alter request |
| Request Status Text | Descriptive text that qualifies the status of the reminder alter request. |

When receiving an MM1_reminder_alter.REQ message as in step 405 of FIG. 6 or step 433 of FIG. 7, the first MMS relay/server checks if the "Reminder Time" information element is empty. If this information element is empty, the first MMS relay/server 30 determines that the MM1_reminder_alter.REQ message is a message requesting to cancel a previously set reminder, and therefore cancels the retrieval reminder service associated with the corresponding multimedia message with reference to the "Message Reference" information element included in the MM1_reminder_alter.REQ message as in step 437 of FIG. 7. If the "Reminder Time" information element is not empty, the first MMS 15 relay/server 30 determines that the MM1_reminder_alter.REQ message is a message requesting either to set a new reminder request, or to modify an already existing reminder. Thus, the first MMS relay/server 30 checks if a reminder already exists for the corresponding multimedia message with reference to the "Message Reference" information element included in the MM1_reminder_alter.REQ message as in step 406 of FIG. 6. If such a reminder does not exist, the first MMS relay/server 30 sets up a new reminder time for the corresponding multimedia message to set a retrieval reminder service. If such a reminder already exists, the first MMS relay/server 30 alters the existing reminder time into the new time specified by the "Reminder Time" information element included in the MM1_reminder_alter.REQ message.

Afterwards, the MMS 30 sends back a response to the received request as in step 411 of FIG. 6 or step 439 of FIG. 7 by using the MM1_reminder_alter.RES message. The "Request Status" information element describes whether the request was successfully executed or not. Optionally, the "Request Status Text" can further describe the concrete reasons why the request was not successfully executed, especially in the case of errors. Some examples of error types are: reminder service not supported, message not found, reminder time not accepted (e.g. reminder time beyond the expiry time), etc.

Figure 8:
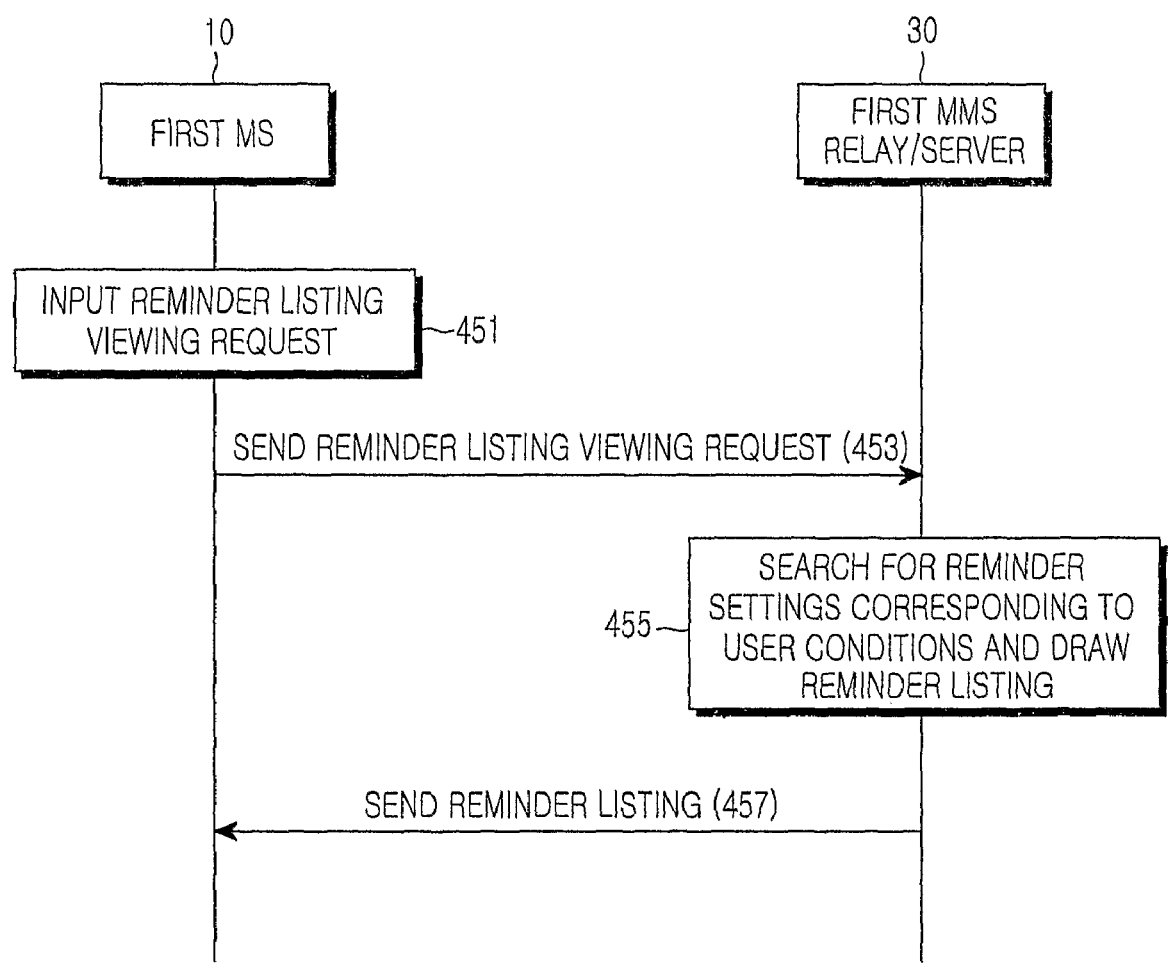
FIG. 8 is a flowchart illustrating a process of requesting to view reminder listing in accordance with the second embodiment of the present invention.

Next, a process of requesting to view reminder listing according to an already set retrieval reminder service with reference to FIG. 8. FIG. 8 illustrates a process of requesting to view reminder listing in accordance with the second embodiment of the present invention. Referring to FIG. 8, in step 451, if the user inputs a request to view reminder listing, the first MS 10 proceeds to step 453. The reminder listing is listing comprising of reminder times already set for any multimedia messages. Thus, in step 451, the user inputs conditions including the reminders to be viewed. For example, the reminders may be reminders related to a specific multimedia message or reminders located in a specific time zone. Once the user completes the inputting, the first MS 10 proceeds to step 453 to transmit the reminder listing viewing request to the first MMS relay/server 30. The first MMS relay/server 30 searches for reminders set correspondingly to the conditions inputted by the user to configure reminder listing, and proceeds to step 457. In step 457, the first MMS relay/server 30 transmit the reminder listing to the first MS 10.

This reminder listing viewing request can be achieved through an MM1_reminder_listview transaction newly defined according to this embodiment of the present invention. The MM1_reminder_listview transaction includes an MM1_reminder_listview.REQ message and an MM1_reminder_listview.RES message. The MM1_reminder_listview.REQ message is a message transmitted when the first MS 10 requests the first MMS relay/server 30 to view reminder listing as in step 453 of FIG. 8, and the MM1_reminder_listview.RES message is a response message to the MM1_reminder_listview.REQ message.

Information elements included in the MM1_reminder_listview.REQ message is shown in Table 5.

TABLE 5

| Information Element | Description |
| --- | --- |
| Message Type | Identifies this message as MM1_reminder_listview.REQ |
| Transaction ID | The identification of the MM1_reminder_listview.REQ/ MM1_reminder_listview.RES pair. |
| MMS Version | Identifies the version of the interface supported by the MS. |
| Message Reference | A reference that locates the message in the MMS Relay/Server, and for which the reminder value needs to be viewed. |
| Reminder Time Start | If "Message Reference" is not present, the MMS Relay/Server shall return the reminders whose times fall after the time specified here. |
| Reminder Time End | If "Message Reference" is not present, the MMS Relay/Server shall return the reminders whose times fall before the time specified here. |

Information elements included in the MM1_reminder_listview.RES message is shown in Table 6.

TABLE 6

| Information Element | Description |
| --- | --- |
| Message Type | Identifies this message as MM1_reminder_listview.RES |
| Transaction ID | The identification of the MM1_reminder_listview.REQ/ MM1_reminder_listview.RES pair. |
| MMS Version | Identifies the version of the interface supported by the MMS Relay/Server. |
| Message Reference | Reference that locates the message in the MMS Relay/Server, and for which the reminder value is viewed. May appear multiple times. |

TABLE 6-continued

| Information Element | Description |
| --- | --- |
| Reminder Time | The reminder time that corresponds to the Message Reference specified above. May appear multiple times. |
| Request Status | If an error occurs, this is a code indicating the exact cause of the error. For successful responses, the Status may be returned with a corresponding success code. |
| Request Status Text | If an error occurs, this may contain explanatory text that corresponds to the Request Status. |

Referring to FIG. 8, in step 455, if receiving an MM1_reminder_listview.REQ request, the first MMS relay/server 30 checks if the "Message Reference" information element is present. If the "Message Reference" information element is present, then the reminder time of a specific multimedia message is requested to be viewed. Thus, the first MMS relay/server 30 searches for the reminder time corresponding to the multimedia message identified by the "Message Reference". If the "Message Reference" information element is not present, the first MMS relay/server 30 checks if the "Reminder Time Start" and/or "Reminder Time End" are present. If so, the first MMS relay/server 30 selects the reminders whose times fall between the given time start and time end boundaries. If only the start time is specified but not the end time, the first MMS relay/server 30 selects all reminders falling after the start time. If only the end time is specified but not the start time, the first MMS relay/server 30 selects all reminders falling before the end time. In addition, if neither the "Message Reference" nor the "Reminder Time Stait/End" information elements are present, then the reminder times of all multimedia messages are requested to be viewed.

In step 457, the first MMS relay/server 30 having selected the corresponding reminder times according to the reminder searching conditions included in the MM1_reminder_listview.REQ message includes the selected reminder times in the MM1_reminder_listview.RES message, and transmits the MM_reminder_listview.RES message to the first MS 10. In this case, a pair of "Message Reference" and the "Reminder Time" information elements must be provided in the MM1_reminder_listview.RES message. If no reminder was set for a specific multimedia message whose reminder times is requested to be viewed, the "Reminder Time" information element must either be omitted in the MM1_reminder_listview.RES message so as to represent that no retrieval reminder service is set for the corresponding multimedia message, or contain a special value recognizable by the first MS 10 to mean "no reminder set for this multimedia message". In the case of an error caused by, for example, a reminder list transaction not supported, a message specified by Message Reference not found, etc., the first MMS relay/server 30 also contains the "Request Status" information element that indicates the type of error and optionally a "Request Status Text" that further describes the error in the MM1_reminder_listview.RES message. In the case of success, the first MMS relay/server 30 may also include the "Request Status" with a corresponding success code in the MM1_reminder_listview.RES message.

Figure 9:
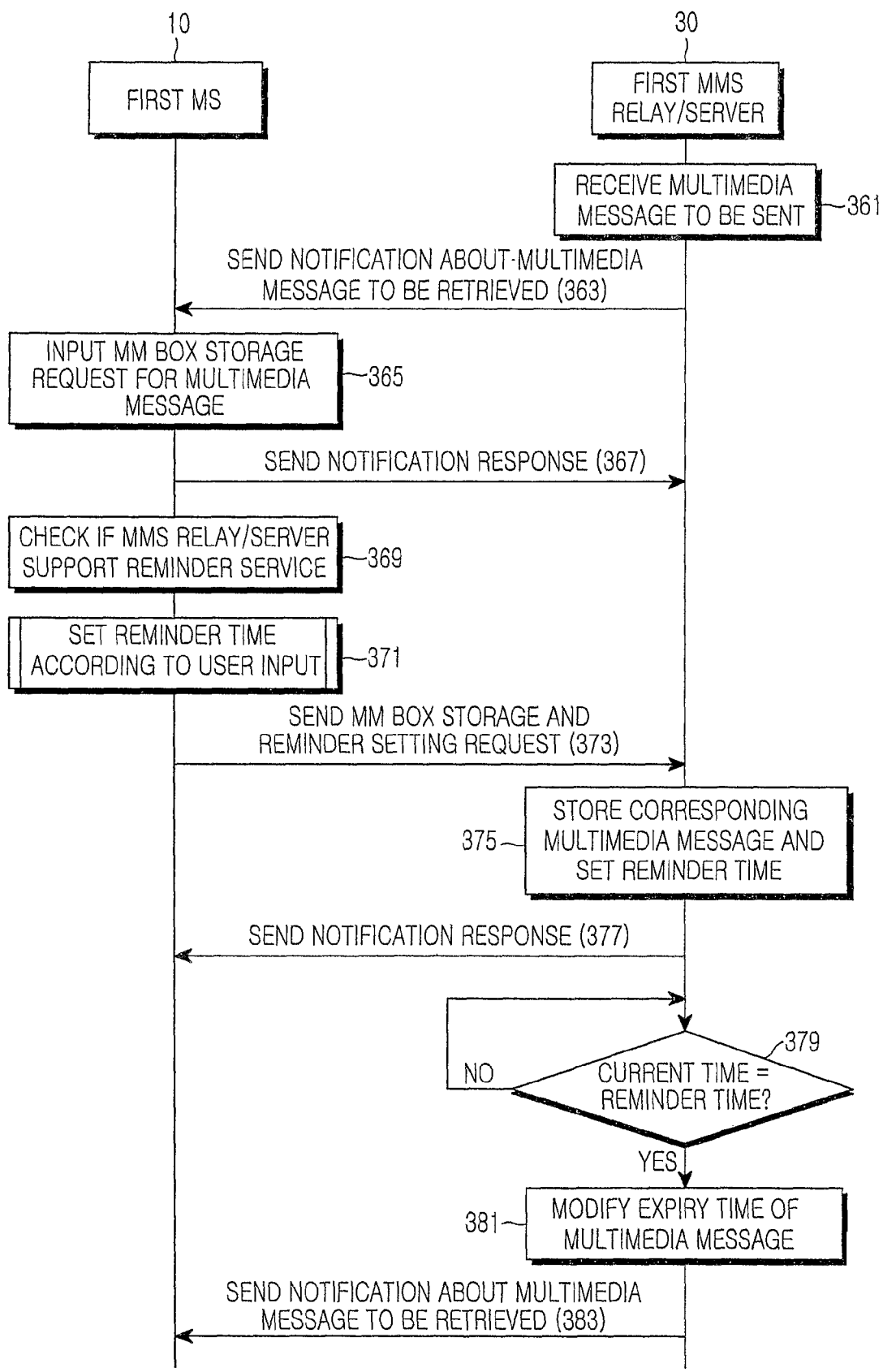
FIG. 9 is a flowchart illustrating a process of setting a reminder service for a multimedia message to be stored in an MM box in accordance with the second preferred embodiment of the present invention.

In the example as previously stated, the setting, modification, cancellation and alteration of the retrieval reminder for a multimedia message temporarily stored in the first MMS relay/server 30, 40 have been described, but they can be similarly applied to a multimedia message which is stored in the MM box 50, 60 or is going to be stored in the MM box 50, 60. A description will be given for a process of setting a reminder while requesting to store a multimedia message, temporarily stored in the first MMS relay/server 30, in the MM box 50, 60 with reference to FIG. 9. FIG. 9 illustrates a process of setting a reminder service for a multimedia message to be stored in an MM box in accordance with the second preferred embodiment of the present invention. Referring to FIG. 9, in step 361, if receiving a multimedia message to be transmitted, the first MMS relay/server 30 proceeds to step 363. In step 363, the first MMS relay/server 30 sends a notification about the multimedia message to be retrieved to the first MS 10. A message used at this time is an MM1_notification.REQ message, and includes the "Allow Reminder" information element as in the previous embodiment. In step 365, if the user inputs not a retrieval request for the corresponding multimedia message but a request for storing it in the MM box 50, the first MS 10 having received the notification proceeds to step 367 to send a standard notification response, that is, an the MM1_notification.REQ including no reminder time information to the first MMS relay/server 30. Thereafter, in step 369, the first MS 10 checks the "Allowed Reminder" information element of the MM1_notification.REQ message to confirm that the first MMS relay/server 30 supports the reminder service, and then proceeds to step 371. In step 371, the first MS 10 sets a reminder time according to the user's inputting, and proceeds to step 373. In step 373, the first MS 10 sends a request to store the multimedia message into the MM box and set a retrieval reminder, including the set reminder time information, to the first MMS relay/server 30. According to this embodiment of the present invention, this requests can be achieved through an MM1_mmbox_store transaction generally used when a request is made to store a multimedia message into the MM box. The MM1_mmbox_store transaction includes an MM1_mmbox_store.REQ message and an MM1_mmbox_store.RES message. The MM1_mmbox_store.REQ message is a message requesting to store a multimedia message into the MM box, and the MM1_mmbox_store.RES message is a response message to the MM1_mmbox_store.REQ message. In order to include a retrieval reminder setting request for any multimedia message in addition to the request to store the multimedia message into the MM box, the MM1_mmbox_store.REQ message includes reminder time information according to this embodiment of the present invention. That is, the reminder time information set in step 371 is included in the MM1_mmbox_store.REQ message.

In step 375, the first MMS relay/server 30 stores the corresponding multimedia message in the MM box 50 as requested, sets the reminder time, and proceeds to step 377. In step 377, the first MMS relay/server 30 transmits a response to the request in step 373, that is, the MM1_mmbox_store.RES message to the first MS 10. Thereafter, in step 379, the first MMS relay/server 30 check if a current time corresponds to the reminder time, and proceeds to step 381 if so. In step 381, the first MMS relay/server 30 appropriately modifies an expiry time of the corresponding multimedia message, and proceeds to step 383. In step 383, the first MMS relay/server 30 notifies the first MS 10 of the existence of the multimedia message to be retrieved together with the modified reminder time information.

Although the process as stated above is exemplified by a case where the MM box storage request and the retrieval reminder setting request for any multimedia message temporarily stored in the first MMS relay/server 30 are simultaneously made, it is possible to set a retrieval reminder for a multimedia message already stored in the MM box 50. It is also possible to modify and cancel a reminder time already set for any multimedia message, and to view reminder listing. These overall processes related to the reminder setting are similar to those shown in FIGS. 6 to 8, and transactions used for the respective requests, for example, the retrieval reminder setting request, the reminder modification request, the reminder cancellation request and the reminder listing viewing request can be achieved through the above-mentioned MM1_reminder_alter transaction. However, the "Message Reference" information element included in the MM1_reminder_alter.REQ message must include information on an address where the corresponding multimedia message will be stored in the MM box 50, 60. According to this embodiment of the present invention, it is also possible to perform the reminder modification request and the reminder cancellation request by including a "Reminder Time" information element in a conventional MM1_mmbox_store transaction. This "Reminder Time" information element is included in an MM1_mmbox_store.REQ message. If the "Reminder Time" information element does not have a value of 0, the first MMS relay/server 30, 40 determines the MM1_mmbox_store.REQ message as a new reminder setting request or a message requesting to modify an already set reminder time. However, if the value of the "Reminder Time" information element is 0, the first MMS relay/server 30 determines the MM1_mmbox_store.REQ message as a reminder cancellation request. In addition, the MM1_mmbox_store.REQ message includes in a "Message Reference in MM Box" information element for a multimedia message related to the retrieval reminder setting.

By adding several information elements according to the present invention to a conventional MM1_mmbox_view transaction, the MM1_mmbox_view transaction can be so configured as to be used as a reminder listing viewing transaction. The MM1_mmbox_view transaction is a transaction used when a request is made to view in formation related to multimedia message listing stored in the MM box 50, 60, and includes an MM1_mmbox_view.REQ message and an MM1_mmbox_view.RES message. The MM1_mmbox view.REQ message is a message through which the MS 10, 20 requests the MMS relay/server 30, 40 to view a multimedia message stored in the MM box 50, 60, and the MM1_mmbox_view.RES message is a response message to the MM1_mmbox_view.REQ message. The MM1_mmbox_view.RES message includes the result about the viewing request, and is transmitted to the MS 10, 20. Information elements added to the MM1_mmbox_view.REQ message in order to be transmitted/received at the reminder listing viewing request are shown in Table 7. Table 7 shows some of the information elements contained in the MM1_mmbox_view.REQ message.

TABLE 7

| Information element | Presence | Description |
| --- | --- | --- |
| Attributes list | Optional | A list of information elements that are to be returned as a group for each MM to be listed in the MM1_mmbox_view.RES. If absent, the default list shall apply. |
| Message Reference list | Optional | One or more Message References which are to have their information elements listed. |
| Select | Optional | A list of multimedia message state or multimedia message flags keywords, by which multimedia messages within the MM box can be selected, if the Message Reference list is absent. |

TABLE 7-continued

| Information element | Presence | Description |
| --- | --- | --- |
| Reminder Time Start | Optional | If "Message Reference" is absent, the MMS Relay/Server shall select multimedia messages with associated reminders and whose times fall after the time specified here. |
| Reminder Time End | Optional | If "Message Reference" is absent, the MMS Relay/Server shall select multimedia messages with associated reminders and whose times fall before the time specified here. |
| ... | ... | ... |

The "Attributes list" information element is information with reference to which a multimedia message is selected, and may include, for example, a specific reminder time, an address of the multimedia message in the MM box, and the like. If the MM1_mmbox_view.REQ message includes the "Attribute list" information element, the MMS relay/server 30, 40 selects a multimedia message with reference to the "Attribute list" information element. If not, the MMS relay/server 30, 40 follows other search criteria such as the "Select" information element when it selects a part of multimedia messages store in the MM box 50, 60. The "Reminder Time Start" and "Reminder Time End" information elements are also criteria for the selection. That is, the MMS relay/server 30, 40 searches for multimedia messages for which reminders are set up and which occur between the specified start and end times.

An "Reminder Time" information element for multimedia messages searched according to the conditions included in the MM1_mmbox_view.REQ message is included in an MM1_mmbox_view.RES message, and then the MM1_mmbox_view.RES message including the information element is transmitted to the MS 10, 20.

Figure 10:
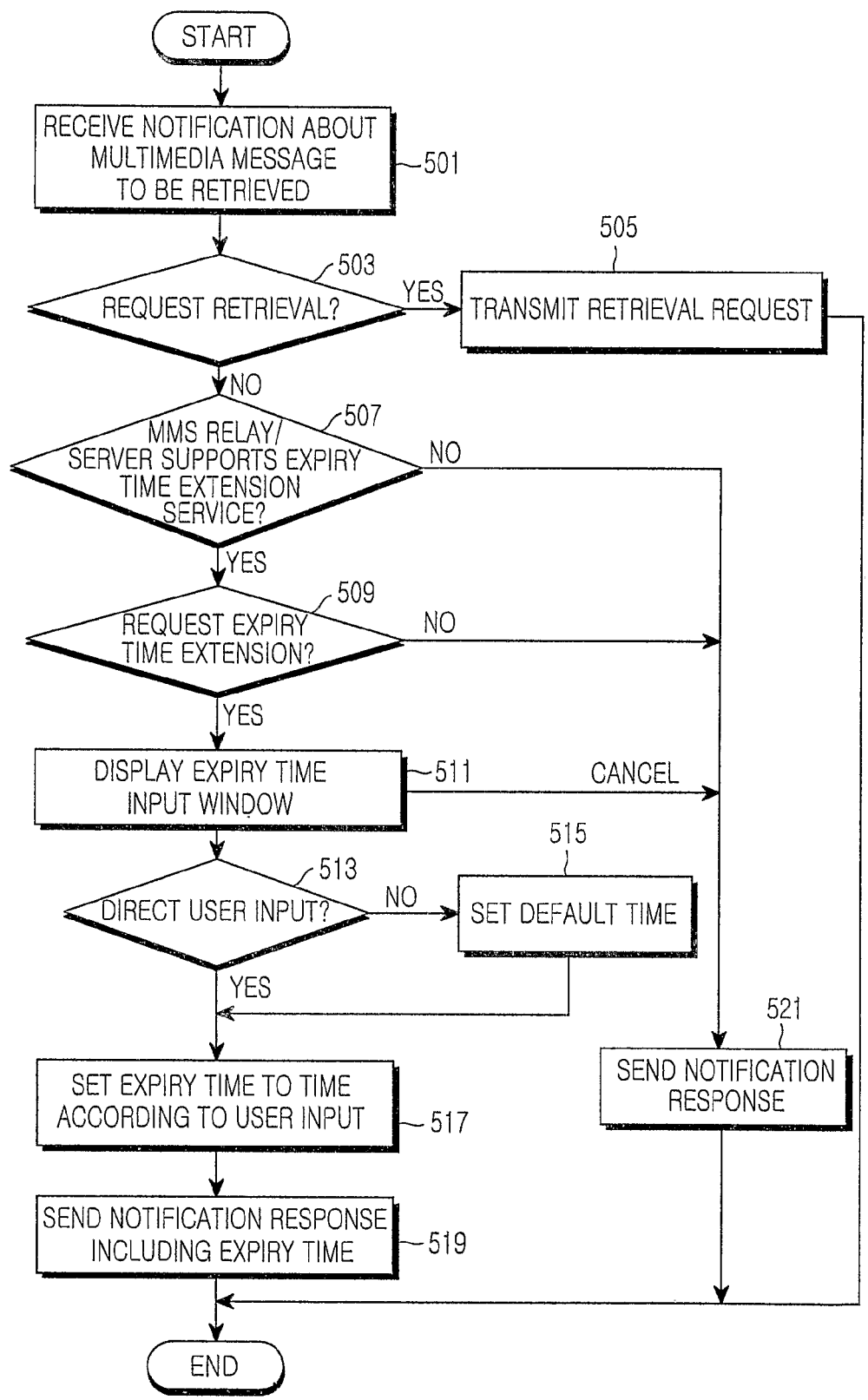
FIG. 10 is an operational flowchart of an MS when it requests to extend an expiry time of a multimedia message in accordance with a third preferred embodiment of the present invention.

In the first and second embodiments of the present invention, a process of setting a retrieval reminder in order to manage a multimedia message. Next, multimedia message management in accordance with a third preferred embodiment of the present invention relates to a process of extending an expiry time of a multimedia message. A multimedia message is automatically deleted after the expiry time associated therewith, regardless whether it is stored in the MMS relay/server 30, 40 or in the MM box 50, 60. Therefore, a user must download the multimedia message before the multimedia message is deleted, but this may not be easy according to circumstances. Thus, in the third embodiment of the present invention, if a request is made to extend an expiry time associated with ant multimedia message through the MS 10, 20 at the reception of a notification about a reminder or at a time the user wishes, the MMS relay/server 30, 40 extends the expiry time to the requested time. This process of extending the expiry time is shown in FIG. 10. FIG. 10 illustrates an operational flowchart of an MS when it requests to extend an expiry time of a multimedia message in accordance with the third embodiment of the present invention, and represents operations of the MS when a multimedia message to be retrieved is notified to the MS. To facilitate to understand the present invention, it is assumed that such operations are performed between the first MS 10 and the first MMS relay/server 30. In step 501, if receiving a notification from the first MMS relay/server 30 that a message has arrived and is waiting for retrieval, the controller unit 101 of the MS 10 proceeds to step 503. The notification is assumed as a reminder notification. In step 503, the controller unit 101 checks the answer from the user. If an immediate retrieval is requested, the controller unit 101 proceeds to step 505, otherwise it proceeds to step 507. In step 505, since the immediate retrieval is requested, the controller unit 101 transmits the immediate retrieval request to the first MMS relay/server 30 as usual, and terminates its operations. In 507, the controller unit 101 checks the notification received in step 501 to verify that the first MMS relay/server 30 supports a service for extending an expiry time associated with a multimedia message. The controller unit 101 proceeds to step 505 if the first MMS relay/server 30 supports the extension service, and proceeds to step 521 if the first MMS relay/server 30 does not support the extension service. In step 521, the controller unit 101 transmits a notification response to the first MMS relay/server 30, and terminates its operations.

In step 509, the controller unit 101 checks if the user inputs a request to extend the expiry time associated with the multimedia message, and proceeds to step 511 if such a request is made. In step 511, the controller unit 101 displays an expiry time input window. Thereafter, in step 413, the controller unit 101 checks if an input given directly by the user exists. If so, the controller unit 101 proceeds to step 517 to set the expiry time to the inputted time. If not, it proceeds to step 515 to set the expiry time to a predetermined default time stored in the first MS 10 and proceed to step 519. In step 519, the controller unit 101 sends a notification response including the set expiry time to the first MMS relay/server 30. If receiving the notification response including the set expiry time, the first MMS relay/server 30 determines that the first MS 10 requests to extend the expiry time associated with the corresponding multimedia message, and thus the expiry time associated with the corresponding multimedia message to the expiry time included in the notification response.

The request to extend the expiry time associated the multimedia message can be configured such that it is achieved through a conventional MM1_notification transaction. Thus, an "Allow Expiry Extension" information element is added to an MM1_notification.REQ message, and an "Expiry Extension Time" information element is added to an MM1_notification.RES message. The "Allow Expiry Extension" information element has a default value of "No", and indicates whether or not the MMS relay/server supports the expiry extension service. Accordingly, in the above-mentioned example, if receiving an MM1_notification.REQ message, that is, a notification about a multimedia message to be retrieved, the first MS 10 checks the "Allow Expiry Extension" information element to verify that the first MMS relay/server 30 supports the expiry extension service. Thereafter, the controller unit 101 includes an expiry time set according to the user's selection as the "Expiry Extension Time" information element in the MM1_notification.RES message, and then transmits the MM1_notification.RES message to the first MMS relay/server 30. If the "Expiry Extension Time" information element exists in the received MM1_notification.RES message, the first MMS relay/server 30 determines that a request is made to replace the existing expiry time associated with the corresponding multimedia message by the expiry time specified in the "Expiry Extension Time" information element, and detects the relevant multimedia message by identifying a "Transaction ID" information element provided in the MM1_notification.RES message. The first MMS relay/server 30 extends the expiry time of the relevant multimedia message accordingly.

Figure 11:
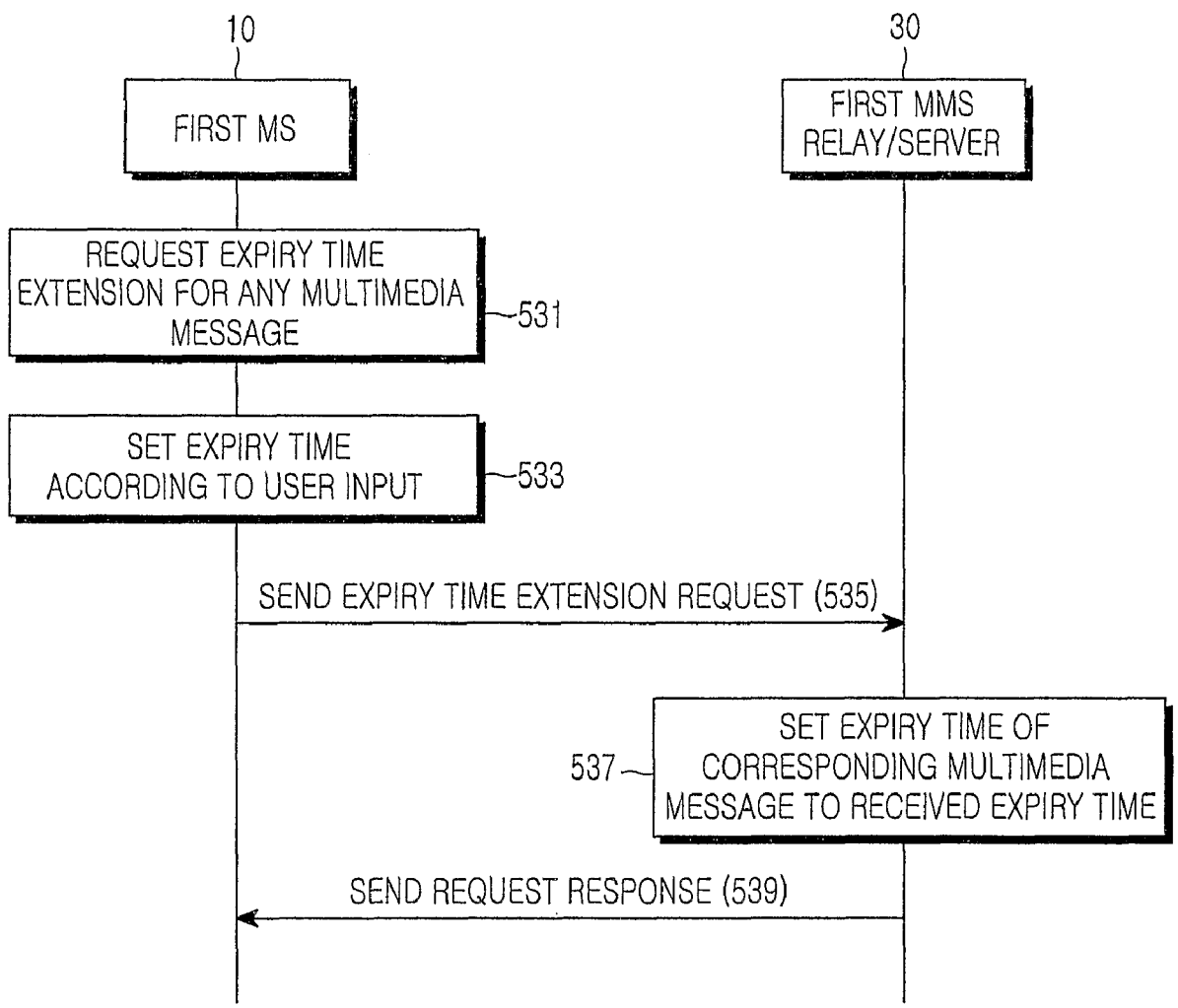
FIG. 11 is a flowchart illustrating a process of extending an expiry time of a multimedia message in accordance with the third preferred embodiment of the present invention.

Although the example as described above is exemplified as a case where the MS 20 extends the expiry time in response to the reception of a reminder notification, the extension service can be configured such that the user is able to extend the expiry time at any time, independently of the reminder notification. Such a process is shown in FIG. 11. FIG. 11 illustrates a process of extending an expiry time of a multimedia message in accordance with the third embodiment of the present invention on the assumption that the process is performed between the first MS 10 and the first MMS relay/server 30. In step 531, if the user requests to extend an expiry time associated with any multimedia message, the first MS 10 proceeds to step 533. In step 533, the first MS 10 sets the expiry time to an expiry time according to the user's selection, and proceeds to step 535. In step 535, the first MS 10 sends a expiry time extension request including the set expiry time to the first MMS relay/server 30. In step 537, if receiving the expiry time extension request, the first MMS relay/server 30 sets the expiry time associated with the corresponding multimedia message to the expiry time included in the received request, and proceeds to step 539. In step 539, the first MMS relay/server 30 sends a response including the result about the request to the first MS 10.

The operations of extending an expiry time associated with a multimedia message can be achieved through an MM1_expiry_extend transaction newly defined according to this embodiment of the present invention. The MM1_expiry_extend transaction includes an MM1_expiry_extend.REQ message and an MM1_expiry_extend.RES message. The MM1_expiry_extend.REQ message is a message transmitted when the MS 10, 20 requests the MMS relay/server 30, 40 to extend an expiry time associated with a multimedia message, and the MM1_expiry_extend.RES message is a response message to the MM1_expiry_extend.REQ message. The MM1_expiry_extend.RES message includes the result about the request, and is sent from the MSS relay/server 30, 40 to the MS 10, 20. Information elements included in the MM1_expiry_extend.REQ message is shown in Table 8, and information elements included in the MM1_expiry_extend.RES message is shown in Table 9.

In the embodiment as shown in FIG. 11, if receiving the MM1_expiry_extend.REQ message in step 535, the first MMS relay/server 30 supporting the expiry time extension service checks the "Message reference" information element to search for the corresponding multimedia message, and updates an expiry time of the searched multimedia message according to the "Expiry Extension Time". Thereafter, in step 539, the first MMS relay/server 30 sends the MM1_expiry_extend.RES message to the first MS 10.

TABLE 8

| Information Element | Description |
| --- | --- |
| Message Type | Identifies this message as MM1_expiry_extend.REQ |
| Transaction ID | The identification of the MM1_expiry_extend.REQ/MM1_expiry_extend.RES pair. |
| MMS Version | Identifies the version of the interface supported by the MS. |
| Message Reference | A reference that locates the message in the MMS Relay/Server. |
| Expiry Extension Time | The extended time of expiry. |

TABLE 9

| Information Element | Description |
| --- | --- |
| Message Type | Identifies this message as MM1_expiry_extend.RES |
| Transaction ID | The identification of the MM1_expiry_extend.REQ/MM1_expiry_extend.RES pair. |
| MMS Version | Identifies the version of the interface supported by the MMS Relay/Server. |
| Request Status | The status of the expiry extend request. |
| Request Status Text | Descriptive text that qualifies the status of the expiry extend request. |

The extension of the expiry time associated with the multimedia message can be applied correspondingly to a multimedia message stored in the MM box 50, 60. First, in the case where the expiry time extension is requested as a response to a reminder notification, the "Message reference" information element included in the notification, that is, the MM1_expiry_extend.RES message must indicate the location of the MM box 50, 60. If receiving the MM1_expiry_extend.RES message including the expiry time extension request, the MMS relay/server 30 find out that the "Message reference" information element indicates a multimedia message stored in the MM box 50, 60, with reference to the MM1_expiry_extend.REQ message related to the MM1_expiry_extend.RES message. As a result of this, the expiry time extension request can be executed.

The extension of the expiry time associated with the multimedia message can be executed at the request of the user, regardless of the reminder notification. Such an extension of the expiry time can be achieved using the MM1_expiry_extend transaction and according to the process as shown in FIG. 11. However, the "Message reference" information element included in the MM1_expiry_extend.REQ message must indicate a multimedia message store in the MM box.

In another embodiment of the present invention, the existing MM1_mmbox_store transaction can be used for the extension of the expiry time by adding a new information element to the MM1_mmbox_store transaction. To this end, a "Expiry Extension Time" information element is included in an MM1_mmbox_store.REQ message of the MM1_mmbox_store transaction. If the "Expiry Extension Time" information element exists in the received MM1_mmbox_store.REQ message, the MMS relay/server 30, 40 determines it as a message requesting to extend an expiry time of a multimedia message indicated by the "Expiry Extension Time" information element included in the MM1_mmbox_store.REQ message, and executes operations corresponding to this expiry time extension request.

As describe above, the present invention can remind a user about a multimedia message waiting for retrieval or stored in its MM box before the message expires. Not only in conjunction with this function but also independently, the possibility to request an extension of the expiry time associated with the message is provided. Therefore, the present invention avoids the multimedia message from being deleted by an MMS relay/server without the recipient user being aware of it. The recipient user does not need to manually track or remember about the message he/she received and waiting for retrieval or stored in the MM box. The recipient user is able to keep any valuable message longer by requesting an extension of the expiry time, which can potentially be sources of higher revenues for the service provider.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for managing multimedia messages by a mobile station in a messaging service system, the method comprising the steps of:
    receiving a multimedia message from a messaging server;
    storing the received multimedia message in a memory;
    receiving a request to set a retrieval reminder for the stored multimedia message by a user;
    setting a reminder time for notifying of receipt of a specific multimedia message from the messaging server according to the user's selection; and
    if a current time corresponds to the reminder time, notifying the user of retrieving the multimedia message stored in memory.

2. The method as claimed in claim 1, wherein setting the reminder time comprises, if a reminder time selected by the user occurs before an expiry time of the specific multimedia message, setting the reminder time for the specific multimedia message to the reminder time selected by the user.

3. The method of claim 1, wherein the multimedia message is a message for notifying that a new multimedia message has arrived at the messaging server from a specific user and waits for retrieval.

4. The method of claim 1, wherein setting the reminder time includes, if a reminder time selected by the user occurs before an expiry time of the specific multimedia message, setting the reminder time for the specific multimedia message to the reminder time selected by the user.

5. A method for managing multimedia messages by a mobile station in a messaging service system, the method comprising the steps of:
    receiving a notification that a multimedia message has arrived and waits reception by a messaging server;
    receiving a reminder set value for notifying that the multimedia message waits reception from a user, the reminder set value including a reminder time when the user wants to be notified about the multimedia message;
    transmitting a request to set a retrieval reminder including the reminder set value to the messaging server;
    receiving a notification message for notifying that the multimedia message waits reception, according to the reminder set value; and
    receiving the multimedia message according to the reminder set value in the messaging server and storing the received multimedia message in the mobile station.

6. The method as claimed in claim 5, further comprising transmitting a request to modify the reminder time set for the multimedia message to the messaging server,
    wherein the reminder time of the multimedia message is modified to a remind time included in the request to modify the reminder time.

7. The method as claimed in claim 6, further comprising:
    transmitting a request to view the reminder time of the multimedia message to the messaging server; and
    receiving the reminder time set for the multimedia message from the messaging server.

8. The method as claimed in claim 7, further comprising:
    transmitting a request to view information of reminders located in a specific time zone to the messaging server; and
    receiving the information of reminders located in a specific time zone from the messaging server.

9. The method as claimed in claim 7, wherein the multimedia message is a multimedia message stored in an MM (Multimedia Message) box.

10. The method as claimed in claim 5, wherein the request to set the retrieval reminder for specific multimedia message is transmitted in response to the notification.

11. The method as claimed in claim 5, further comprising the steps of:
transmitting a request to extend an expiry time of the multimedia message to the messaging server,
wherein the expiry time of the specific multimedia message is set to an expiry time included in the request to extend the expiry time.

12. The method as claimed in claim 11, wherein the multimedia message is a multimedia message stored in an MM box.

13. The method as claimed in claim 11, wherein the request to extend the expiry time is transmitted in response to the notification message according to the reminder.

14. The method as claimed in claim 13, wherein the request to extend the expiry time is executed through an MM1_notification transaction including an "Expiry Time" information element.

15. A mobile station for managing multimedia messages in a messaging service system, the mobile station comprising:
a controller unit for controlling reception and display of a notification that a multimedia message has arrived and is waiting for reception from a messaging server;
a key input unit for receiving a reminder set value for notifying that the multimedia message waits for reception from a user, the reminder set value includes a reminder time when the user wants to be notified about the multimedia message;
a transceiver unit for transmitting a request to set a retrieval reminder including the reminder set value to the messaging server, receiving a notification message for notifying that the multimedia message waits for reception, according to the reminder set value from the messaging server, and receiving the multimedia message from the messaging server;
a memory unit for storing the received multimedia message in the mobile station;
and
a display unit for displaying the received multimedia message from the messaging server.

16. The mobile station of claim 15, wherein the transceiver unit transmits a request to modify the reminder time set for the multimedia message to the messaging server, the messaging server modifies the reminder time of the multimedia message to a remind time included in the request to modify the reminder time.

17. The mobile station of claim 16, wherein the transceiver unit transmits a request to view the reminder time of the multimedia message to the messaging server, and receives the reminder time set for the multimedia message to the mobile station from the messaging server.

18. The mobile station of claim 17, wherein the multimedia message is a multimedia message stored in an MM box.

19. The mobile station of claim 17, wherein the request to set the retrieval reminder for the multimedia message is transmitted in response to a notification about reception of the multimedia message.

20. The mobile station of claim 16, wherein the transceiver unit transmits a request to extend an expiry time of the multimedia message to the messaging server, the messaging server sets the expiry time of the multimedia message to an expiry time included in the request to extend the expiry time.

21. The mobile station of claim 20, wherein the multimedia message is a multimedia message stored in an MM box.

22. The mobile station of claim 20, wherein the request to extend the expiry time is received in response to a notification according to the reminder.

* * * * *